United States Patent [19]
Harada

[11] Patent Number: 6,052,645
[45] Date of Patent: Apr. 18, 2000

[54] MAP DATA DISTRIBUTION SYSTEM AND MAP DATA ACQUISITION DEVICE SUITABLE FOR SUCH SYSTEM

[75] Inventor: Tomoyasu Harada, Susono, Japan

[73] Assignee: Toyota Jodosha Kabushiki Kaisha, Aichi-ken, Japan

[21] Appl. No.: 09/104,701

[22] Filed: Jun. 25, 1998

[30]     Foreign Application Priority Data

Jul. 17, 1997   [JP]   Japan ................................. 9-192428

[51] Int. Cl.⁷ ............................................. G06F 165/00
[52] U.S. Cl. ...................... 701/212; 701/202; 701/209; 340/990; 340/995
[58] Field of Search .................................. 701/200, 202, 701/207, 208, 209, 211, 212; 73/178 R; 340/988, 990, 995

[56]                References Cited

U.S. PATENT DOCUMENTS

| | | | |
|---|---|---|---|
| 4,675,676 | 6/1987 | Takanabe et al. ...................... | 701/212 |
| 4,757,455 | 7/1988 | Tsunoda et al. ....................... | 701/208 |
| 4,954,958 | 9/1990 | Savage et al. ......................... | 701/202 |
| 5,084,822 | 1/1992 | Hayami ................................. | 701/212 |
| 5,172,321 | 12/1992 | Ghaem et al. .......................... | 701/202 |
| 5,450,343 | 9/1995 | Yurimoto et al. ....................... | 701/208 |
| 5,850,618 | 12/1998 | Suetsugu et al. ...................... | 701/209 |
| 5,864,305 | 1/1999 | Rosenquist ............................. | 701/208 |

FOREIGN PATENT DOCUMENTS

7-262493   10/1995   Japan .

*Primary Examiner*—Gary Chin
*Attorney, Agent, or Firm*—Finnegan, Henderson, Farabow, Garrett & Dunner, L.L.P.

[57]                ABSTRACT

A map data acquisition device is integrally mounted to an in-vehicle navigation device. Small scale map data is constantly carried in a database, while large scale, detailed map data is transmitted through communication from an information center serving as a base station. Using the small scale map data, guidance is provided using the main roads. The traveling condition of the vehicle is detected and large scale map data is acquired when judged necessary based on the traveling conditions. For example, when the vehicle deviates from the established route, approaches a construction site indicated by traffic information, or nears the destination, detailed map data is acquired. Therefore, the appropriate detailed map is acquired at an appropriate point to cope with any changes in traveling conditions.

8 Claims, 5 Drawing Sheets

Fig. 1

ROUTE GUIDANCE PROCESS

Fig. 2

ROUTE DEVIATION PROCESS

Fig. 3

DETOUR ROUTE GUIDANCE PROCESS

MAP DATA DISTRIBUTION SYSTEM AND MAP DATA ACQUISITION DEVICE SUITABLE FOR SUCH SYSTEM

BACKGROUND OF THE INVENTION

1. Field of the Invention

The present invention generally relates to map data distribution systems, and more particularly to a system for a transportable device to acquire a necessary detailed map from a base station. The present invention also relates to a map data acquisition device mounted to the transportable device and suited for use in such system. The expression "detailed map" means a map with detailed information about a relatively small area. Maps other than the detailed map, i.e. general maps, may be pre-stored in the vehicle. The present invention is suitable for use in a navigation device for vehicles.

2. Description of the Related Art

As electronic devices that utilize map data, navigation devices are well known. Such navigation devices commonly present a map of the area around the current position of a vehicle and perform route guidance to a destination using the map data. Generally, such a navigation device is provided with a storage medium (such as a CD-ROM) having map data stored therein, from which necessary map data is read out.

However, to have the medium on which is stored detailed maps for a wide area available, requires always carrying rarely used maps, which can be very inefficient. Therefore, a type of navigation device has been proposed that acquires the detailed map of a given area from an external source when such map is needed. This type of system is disclosed, for example, in Japanese Patent Laid-Open Publication No. Hei 7-262493.

According to the system disclosed in the above publication, a general nationwide map including main roads is stored in a transportable device and a user instructs the transportable device to acquire a detailed map of a desired area. In response to the instruction, the transportable device obtains the detailed map from a base station. When route guidance is to be carried out, following operations are performed. When a user at a starting point inputs a destination, a detailed map of the area surrounding the destination is acquired. When the vehicle begins travelling, route guidance is initiated using the general map and the detailed map for the area surrounding the destination.

However, even though the detailed map of the destination is acquired at the starting point, a great distance is left before reaching the destination. If the destination is modified on the way, the detailed map acquired through communication processes will be wasted. Even if the destination is not modified, the detailed map of the destination occupies a portion of the memory capacity during the travel, which is not preferable in terms of efficient memory use. With this system, the information which is not used for a while must be kept in the memory, resulting in the need for increase in memory capacity.

The traveling conditions continuously change while the vehicle is running. For example, a vehicle may deviate from the route established to reach the destination. In a conventional system, a user must enter an instruction him/herself to acquire a large scale map of the area where the vehicle has entered. However, the user may not know where it has started to deviate or for which area the detailed map is needed in order to return to the established route. Thus, it is not easy for a user to decide which detailed map is necessary to cope with the change in traveling conditions. Even if a user can make such decision, giving an instruction to acquire the necessary detailed map is troublesome for the user.

In order to avoid the above problems, one can envision acquisition of the detailed maps for all the areas the vehicle travels through before reaching the destination. However, this increases the load of the communication device and interferes with communication of other types of information (such as traffic information), and also leads to an increase in required memory capacity of the transportable device. Since a great number of unnecessary maps are also acquired, an advantage of obtaining only the necessary data cannot be enjoyed.

As described above, according to conventional systems, detailed maps are automatically acquired based on the positional information regardless of the traveling conditions. As a result, it is often the case that unnecessary detailed maps are acquired and that such acquisition is made too early. The map which is truly necessary to cope with the change in traveling conditions cannot be acquired without a user's instruction. Consequently, the data storage space of the transportable device cannot be efficiently utilized, and also useful detailed maps cannot be acquired at the appropriate time. The above-described problems are not limited to vehicle-mounted devices but are encountered in other types of transportable devices as well.

SUMMARY OF THE INVENTION

An object of the present invention is to provide a map data distribution system which allows acquisition of a useful detailed map at an appropriate timing, and also to provide a map data acquisition device for a transportable device suitable for use in such system.

In order to solve the above-described problems, in the system according to the present invention, a user's need for a detailed map is estimated based on the traveling conditions and the detailed map is automatically acquired at an appropriate timing.

According to the map data distribution system of the present invention, a base station and a transportable device are connected with each other through communication means, and the transportable device acquires map data distributed from the base station. The transportable device includes traveling condition detection means for detecting traveling conditions of the transportable device, and request means for sending a request to the base station for detailed map data of an area surrounding or neighboring the transportable device when the detailed map of the area is determined to be required based on the detected traveling conditions. In response to the request from the transportable device, the base station distributes the detailed map data of the area indicated by the request to the transportable device.

The map data acquisition device of the present invention is a device mounted to a transportable device for acquiring map data distributed from a base station via communication means. This acquisition device includes traveling condition detection means for detecting traveling conditions of the transportable device, and request means for sending a request to the base station for detailed map data of an area surrounding or neighboring the transportable device when the detailed map of the area is determined to be required based on the traveling conditions. The device acquires said detailed map data distributed from the base station in response to the request.

It should be noted that "transportable device" includes vehicles, ships, airplanes, portable terminal devices carried by auser, and the like, and that "base station" includes, for example, an information center providing the transportable device with various types of information.

Preferably, according to one aspect of the present invention, the traveling condition detection means includes positional relation detection means for detecting the positional relation between a destination and a current position of the transportable device. The request means requests the detailed map data around the destination when the transportable device is detected to have approached to the destination.

In this aspect, the positional relation between the current position and the destination is detected as the traveling condition. The detailed map of the destination will not be acquired until the transportable device approaches to the destination, that is, until such map is actually needed. Dealing with a change in destination during travelling, a detailed map of the changed destination is acquired, thereby avoiding unnecessary or premature map acquisition.

Preferably, according to another aspect of the present invention, the map data acquisition device includes route establishing means for establishing an appropriate route to a destination. The traveling condition detection means includes deviation detection means for detecting whether or not the transportable device has deviated from the established route. The request means requests detailed map data around the deviation point when the transportable device has deviated from the established route.

According to this aspect of the invention, whether or not the transportable device has deviated from the established route is detected as the traveling condition. When an unexpected traveling condition (deviation) arises, the detailed map around the deviation point is automatically acquired. Using this detailed map, the transportable device can be led back to the originally established route. An appropriate route guidance can be carried out even when the user does not know the deviation point or when the user does not even know that the deviation has been occurred.

Preferably, according to a still another aspect of the present invention, the map data acquisition device includes route establishing means for establishing an appropriate route to a destination. The traveling condition detection means includes traffic condition detection means for detecting the positional relation between the current position of the transportable device and a site on the established route for which a change in the route is required when traffic information indicating that such site exists on the route is obtained. The request means requests the detailed map data around said site when the transportable device has approached to said site requiring a change in the established route.

According to this aspect, the traveling conditions related to traffic information are detected. The sites for which a change in the established route is required include construction sites, traffic congestion sites, road closure sites due to accidents, and so on. When the transportable device approaches such a site, it is determined that unexpected traveling conditions have occurred and that a detailed map is required. The detailed map is then automatically acquired. Using this detailed map, the established route is changed and route guidance is performed with the changed route.

As described above, the present invention allows detection of the traveling conditions such as approach to the destination, deviation from the established route, approach to the traffic congestion site, and so on. Coping with a change in the detected traveling conditions, a useful detailed map is automatically acquired for the transportable device at an appropriate timing. As a result, the map will not be acquired unnecessarily or too early. The number of communications conducted can be safely reduced and the data storage space of the transportable device can be efficiently utilized.

BRIEF DESCRIPTION OF THE DRAWINGS

FIG. 3 and FIG. 4 are sub-flowcharts showing route deviation and detour route guidance processes, respectively, shown in FIG. 2.

DESCRIPTION OF THE PREFERRED EMBODIMENT

Now, a preferred embodiment of the present invention will be described with reference to the drawings. In the following description, the map data acquisition device of the present invention is provided integrally with an in-vehicle navigation device. A map data distribution system is formed by such navigation device and an information center, which is an infrastructure installation corresponding to the base station of the present invention.

Figure 1:
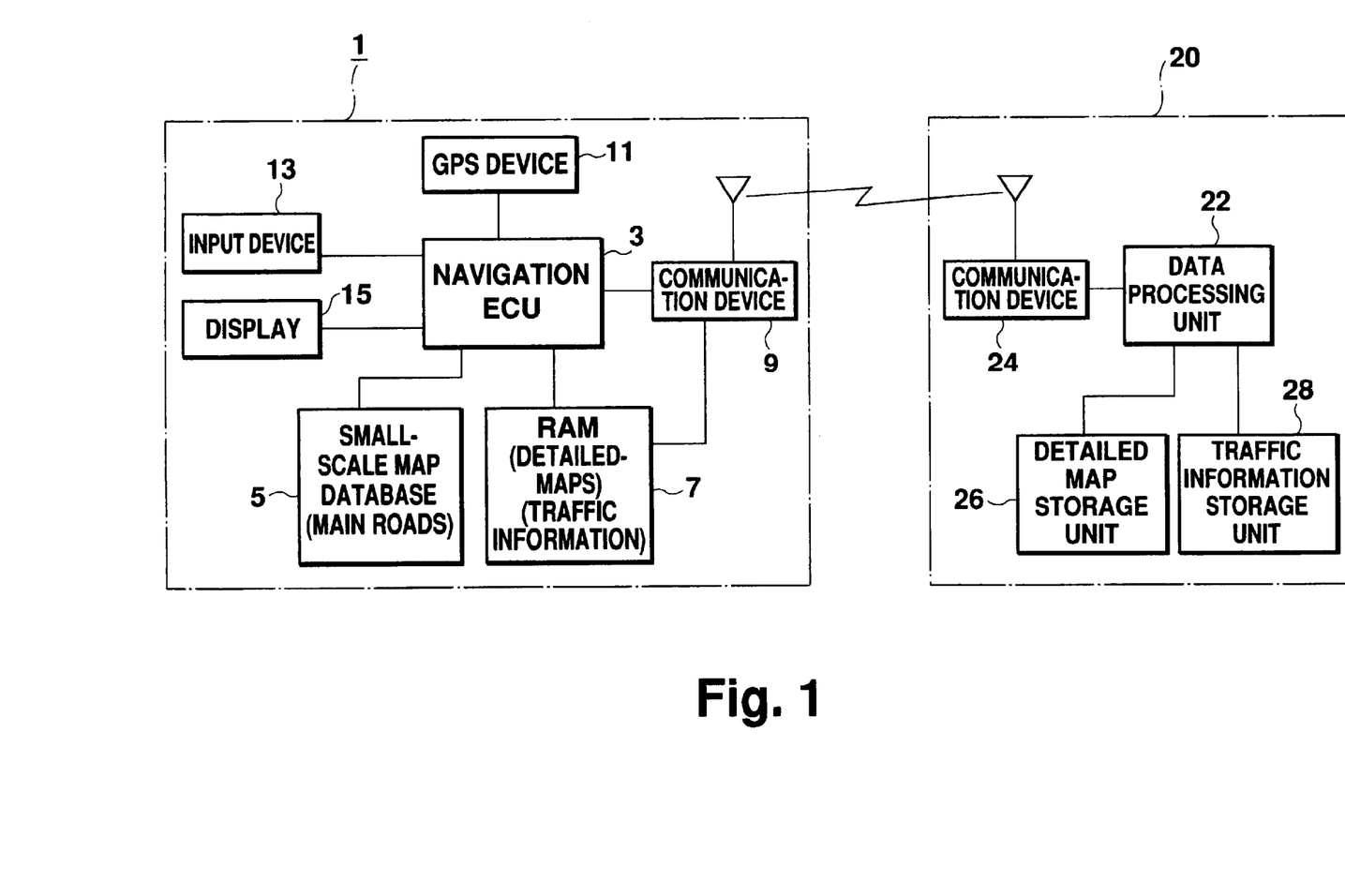
FIG. 1 is a block diagram showing an overall configuration of the present invention.

FIG. 1 is a block diagram showing an overall configuration of the present system. An in-vehicle navigation device 1 is provided with a navigation ECU 3, which controls the entire device and performs routing guidance. Main tasks achieved through route guidance include setting up the optimum route to the destination and providing guidance with use of the thus set-up route.

The navigation ECU 3 is connected to a small scale map database 5, in which general map data, i.e. a general nationwide map on a small scale, is stored. Such general map data contains information about main roads including national roads and expressways. The general map data also includes data for route calculation (link data). The link data stored in the database 5 is limited to the data necessary for establishing the routes taking the main roads. Thus, only the data related to the main roads needs to be stored in the database 5, resulting in a small amount of stored data. In addition, route calculation using the data in the database 5 can be performed quickly because the amount of data to be processed for route calculation is small. The small scale map database 5 is preferably stored in a storage medium such as a CD-ROM.

The navigation ECU 3 is also connected to a RAM 7 for storing detailed map data. As described above, the detailed map data is the data containing detailed information about a relatively small area. In the present embodiment, a large scale map is handled as detailed map data. The navigation ECU 3 appropriately acquires necessary detailed map data from the information center with use of a communication device 9. The detailed map data thus acquired is written in the RAM 7 under the control of the navigation ECU 3. The navigation ECU 3 also acquires traffic information from the information center by using the communication device 9, and such traffic information is also written in the RAM 7.

The navigation ECU 3 is further connected to a GPS (Global Positioning System) device 11. By using signals transmitted from navigation satellites, the GPS device 11 detects the current position of the vehicle, which is further transmitted to the navigation ECU 3. It should be noted that current position detecting devices other than GPS devices can also be used in the present embodiment, including the devices for satellite, autonomous, or electronic navigation.

The navigation ECU 3 is also connected to an input device 13 and a display 15 serving as output means. Various types of instructions provided by a user to the navigation device are entered into the navigation ECU 3 through the input device 13. Such instructions include the destination of the vehicle. The input device 13 may include interfaces such as a joystick, a set of switches, and a speech recognition device. The display 15 presents a map for route guidance. On the display, a map covering the current position and the destination is presented and a mark indicating the current position is displayed on the map. The route to the destination is displayed distinctively from other roads. The display 15 also presents various types of images (such as an image for entry of the destination) to support user's operations.

The navigation ECU 3 functions as traveling condition detection means and request means, which are characteristic features of the present invention. Through such function as the traveling condition detection means, particularly the following three traveling conditions are detected: (1) the relation between the vehicle's current position and the destination, (2) whether or not the vehicle has deviated from the established route during route guidance, and (3) relation between the vehicle's current position and any construction site or traffic congestion site present on the established route. Based on such information, the navigation ECU 3 requests the information center to transmit the necessary detailed map data by using the communication device 9 as described below.

A configuration of the information center 20 will now be described. At the information center 20, a data processing unit 22 controls the entire center. The data processing unit 22 is connected to a communication device 24, which is used by the unit 22 to conduct various types of data communication with the vehicle.

The data processing unit 22 is further connected to a detailed map storage unit 26, which stores detailed nation-wide map data to be provided to vehicles. In response to a request from a vehicle, the data processing unit 22 reads out the detailed map data of the area indicated by the request from the detailed map storage unit 26 and distributes the data to the vehicle with use of the communication device 24.

The data processing unit 22 is further connected to a traffic information storage unit 28. The unit 22 directs the traffic information storage unit 28 to store the traffic information obtained from the source external to the center. Such traffic information includes construction sites and schedule, traffic congestion sites and their degrees, road closure sites due to accidents, and the like. The traffic information storage unit 28 always carries the latest traffic information, which is transmitted from the communication device 24 to vehicles when necessary. The in-vehicle navigation device 1 may obtain traffic information from FM multi-broadcasts or from signals transmitted by roadside beacons.

Figure 2:
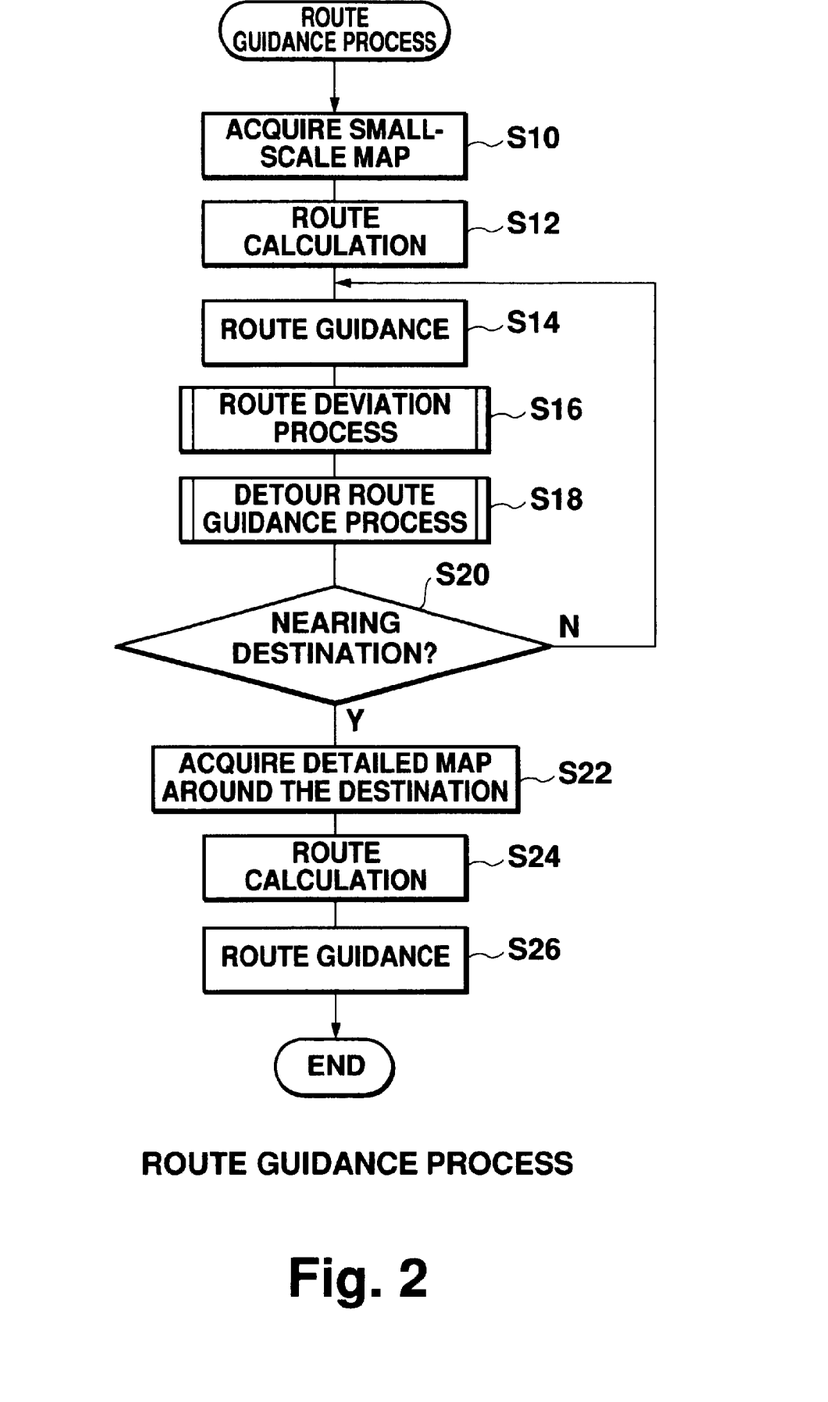
FIG. 2 is a flow chart showing operations of the system shown in FIG. 1.
Figure 3:
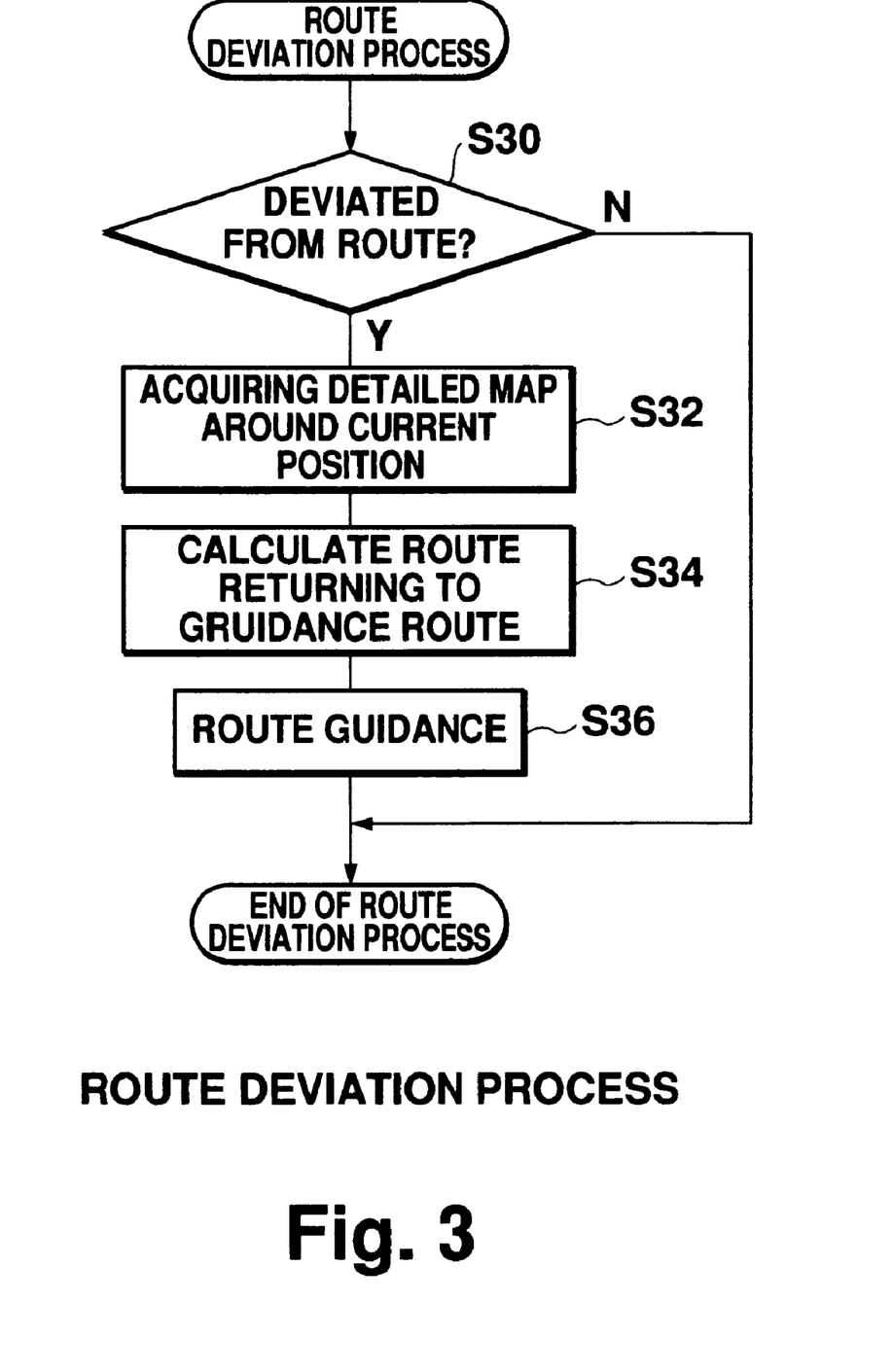
Figure 4:
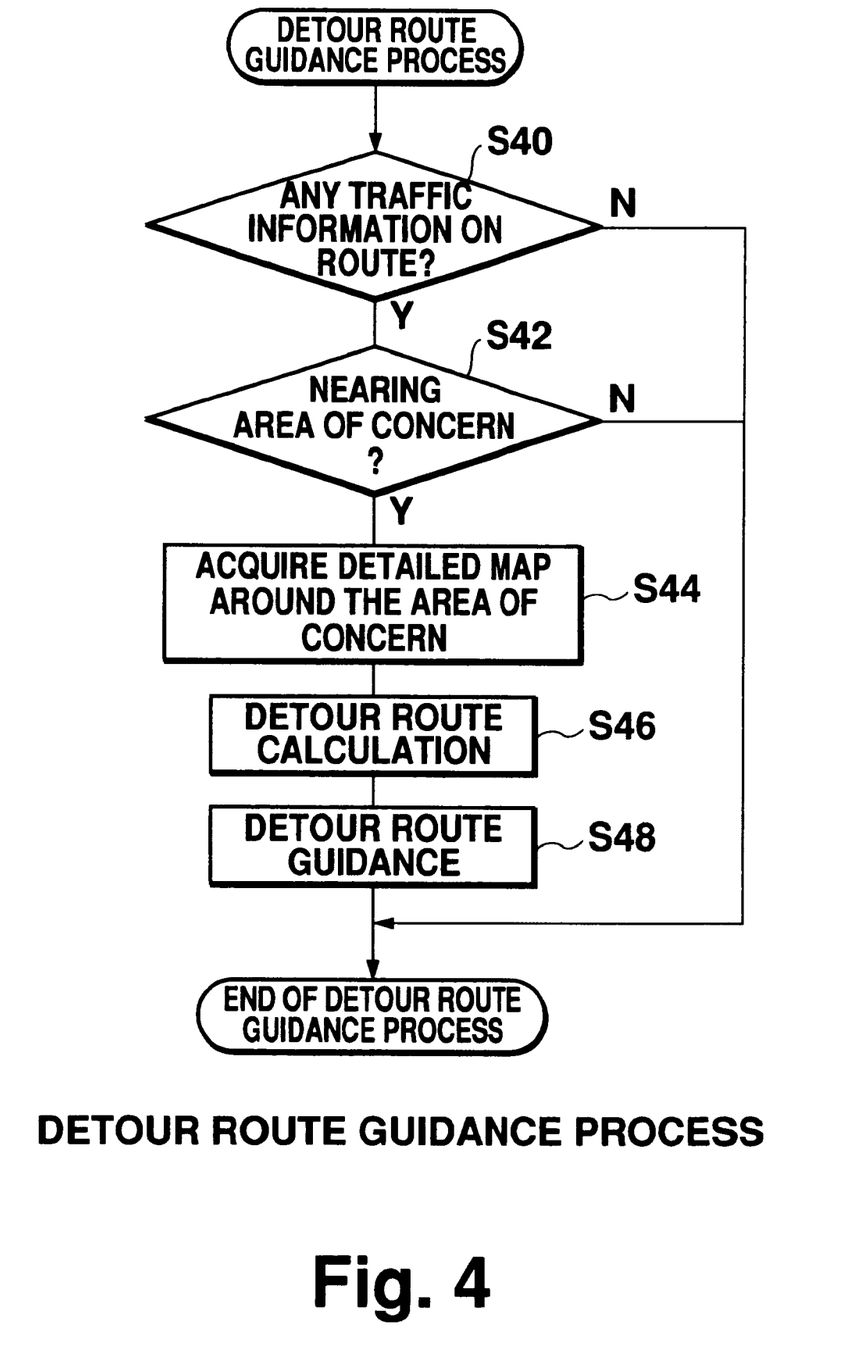
Figure 5:
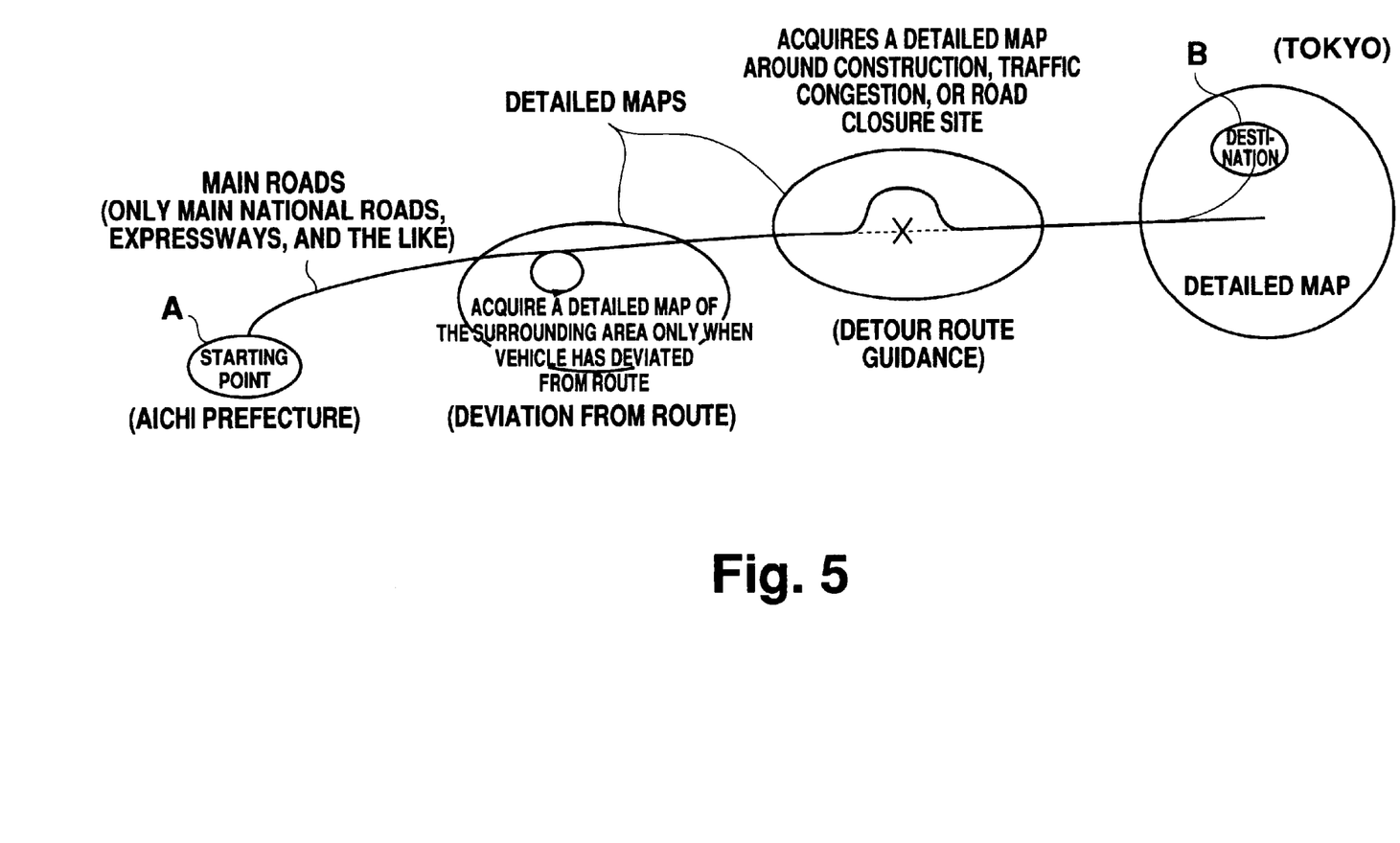
FIG. 5 shows a model of the detailed maps acquired by the device shown in FIG. 1.

Operations of the system shown in FIG. 1 will now be described. FIGS. 2–4 are flowcharts showing operations performed at the vehicle. Reference to FIG. 5 facilitates understanding of the operations of the present system. Referring to FIG. 2, route guidance processes are initiated by the user's entry of a destination. The navigation ECU 3 reads out a small scale map containing the current position and the destination from the database 5 based on the output of the GPS device 11 (S 10). Using the read-out map data, the navigation ECU 3 seeks and establishes the optimum route from the current position to the destination (S 12). Route selection may be performed by conventional methods such as the Dijkstra method. Since only the data regarding main roads is used for selecting the route, route calculation is completed in a short time. However, at this stage, the detailed map data around the destination is not yet acquired by the vehicle. Therefore, a route that allows the vehicle to come as close as possible to the destination is sought by using the small scale map.

The navigation ECU 3 performs route guidance by using the route established by route calculation (S 14). A small scale map covering the current position and the destination is presented on the display 15 by the navigation ECU 3. On the map, the established route is displayed distinctively from other roads. After performing route deviation process (S 16) and detour route guidance process (S 18), which will be described below, the navigation ECU 3 determines whether or not the vehicle has approached the destination area based on the output from the GPS device 11 (S 20). If it has not approached yet, the process returns to the step S 14 and proceeds with the route guidance with use of the small scale map.

FIG. 3 is a sub-flowchart showing the above route deviation process at S 16. For the route deviation process, the navigation ECU 3 first determines whether or not the vehicle has deviated from the route established at the step S 12 based on the output of the GPS device 11(S 30). At this stage, the navigation ECU 3 serves as the traveling condition detection means to detect deviation from the route. For example, when the distance between the current position and the established route is greater than a prescribed distance, such situation is regarded as occurrence of deviation. If the vehicle does not deviate from the route, the route deviation process is terminated and the process returns to the steps shown in FIG. 2.

If the vehicle deviates from the route, the navigation ECU 3 acquires the detailed map data of the area surrounding the current position from the information center 20 (S 32). For the acquisition, the navigation ECU 3 requests the information center 20 supply a map using the communication device 9. This request for a map indicates the area for which the detailed map data is needed. At this stage, the transmitted request includes the current position of the vehicle and indicates that the detailed map data of the current position and the area therearound is required. Thus, at step S 32, the navigation ECU 3 serves as the request means of the present invention. Upon reception of the request for a map from the vehicle, the data processing unit 22 of the information center 20 returns the detailed map data in response thereto. The detailed map data of the area surrounding the point indicated by the request is read out from the detailed map storage unit 26 and transmitted to the vehicle through the communication device 24.

On the vehicle side, the detailed map data thus acquired is written in the RAM 7, from which the navigation ECU 3 reads out the detailed map data to be used for route calculation (S 34). A route leading the vehicle back to the guidance route established at the step S 12 is sought and established.

The navigation ECU 3 performs route guidance using the returning route established at the step S 34 (S 36). The detailed map around the current position is presented at the display 15, and the route that should be taken to return to the original route is displayed distinctively from other roads. The route guidance at S 36 continues until the vehicle returns to the original route, and such return brings an end to the route deviation process to go back to the steps shown in FIG. 2. The route guidance using the small scale map is begun again.

FIG. 4 is a sub-flowchart showing a detour route guidance process at S 18 in FIG. 2. At this stage, the navigation ECU 3 serves as the traveling condition detection means, and the positional relation between the current position and a road construction site, for instance, is detected as the traveling condition. First, the navigation ECU 3 determines whether or not there is traffic information related to any spot on the route established at S 12 (S 40), especially the traffic information which indicates the necessity of change in the established route. More specifically, such information includes construction, traffic congestion, and road closure (due to accidents) currently taking place. If there is no such information, the detour route guidance process is terminated and the process returns to the steps shown in FIG. 2. If any problematic traffic information is found at S 40, determination is made as to whether or not the vehicle has neared the area of concern indicated by the traffic information (S 42). If not, the detour route guidance process is terminated and the process returns to the steps shown in FIG. 2.

When the vehicle has neared the area, the navigation ECU 3 acquires the detailed map data of the region surrounding that area of concern (S 44). Map acquisition at this stage is performed similarly to the above-described route deviation process. The navigation ECU 3 sends a request to the information center 20 for transmission of the data indicating the above area of concern. The data processing unit 22 of the information center 20 responds to the request by reading out the detailed map data of that area from the detailed map storage unit 26 and sending the data back to the vehicle by using the communication device 24.

At the vehicle, the navigation ECU 3 calculates the detour route to be taken instead of the original route by using the detailed map data (S 46). For example, if a construction site is present on the route, another route is calculated for detouring around the construction site to deviate once from the main road and then returning to the original main road. The navigation ECU 3 performs detour route guidance by using the thus calculated detour route (S 48). A display 15 presents a detailed map of the area around the construction site, showing that a part of the originally established route is under construction and presenting the detour route calculated at the step S 46. Based on the output from the GPS device 11, the navigation ECU 3 continues the detour route guidance at S 48 until the vehicle returns to the originally established route from the detour route. When the vehicle returns, the detour route guidance process is terminated and the process goes back to the steps shown in FIG. 2, and the route guidance by using the small scale map is initiated again.

Referring again to FIG. 2, determination is made at S 20 as to whether or not the vehicle has approached the destination based on the output of the GPS device 11, as described above. At this stage also, the navigation ECU 3 serves as the traveling condition detection means to detect the positional relation between the destination and the current position as the traveling condition. When the distance between the current position and the destination reaches a prescribed distance, the determination at S 20 is made as YES.

When the vehicle has approached the destination, the navigation ECU 3 acquires the detailed map data around the destination from the information center 20 (S 22). The map acquisition at this stage is performed similarly to the one described above. The navigation ECU 3 transmits a request for a map indicating the destination to the information center 20 by using the communication device 9. Responding to the request, the data processing unit 22 of the information center 20 reads out the detailed map data of the area indicated by the request from the detailed map storage unit 26 and sends the data back to the vehicle by using the communication device 24.

At the vehicle, the route is calculated using the detailed map data thus acquired (S 24). For the initial route calculation conducted at S 12, the route is calculated by using only the small scale map data, and therefore the final route to the destination is not yet calculated. At the step S 24, the navigation ECU 3 conducts route calculation by using both the small scale map data and the detailed map data (or only the detailed map data), thereby seeking and establishing the route that leads the vehicle to the destination from the main road. The navigation ECU 3 performs route guidance by using the thus calculated route (S 26). The display 15 presents a detailed map around the destination, showing the marks for the current position and the destination on the map. In addition, the established route from the current position to the destination is displayed distinctively from other roads. Based on the output from the GPS device 11, the navigation ECU 3 continues the route guidance at S 26 until the current position reaches the destination. When the destination is reached, the route guidance process shown in FIG. 2 is completed.

FIG. 5 shows a model of the detailed maps acquired by the in-vehicle navigation device 1 according to the present embodiment. In the example shown in FIG. 5, the starting point is a point A in Japan's Aichi prefecture and the destination is a point B in Tokyo. Route guidance is initiated by an input of the destination at the starting point. First, route guidance is performed actively using the main roads such as major national roads and expressways, and a vehicle travels in accordance with this guidance.

The vehicle may sometimes deviate from the established route on the way. In this case, a detailed map data around the deviation point is acquired for the vehicle, as shown. Using the detailed map data, route guidance is conducted so that the vehicle returns to the originally established route. When the deviated vehicle returns to the originally established route, route guidance based on the small scale map is resumed.

As shown in the figure, if a traffic obstacle such as construction, traffic congestion, and road closure due to accidents is present on the established route before reaching the destination, such traffic obstacle is detected based on the traffic information. When the vehicle has approached the obstacle site, the detailed map data is acquired and used for route guidance to detour the traffic obstacle. When such detouring is terminated, the route guidance based on the small scale map is resumed.

When the vehicle has neared Tokyo, the detailed map data for the Tokyo area is acquired and used for seeking a route to the destination B from the main road, and route guidance using the calculated route is performed.

In the preferred embodiment described above, the map data which must be prepared at the vehicle before traveling is only the general, small scale map data; the large scale map data is acquired when necessary. As a result, only a small amount of data needs to be stored at the vehicle. Moreover, route calculation can be rapidly achieved because the calculation is carried out using the data related to main roads stored in the small scale map database 5 at the beginning of the drive.

Particularly, in the present embodiment, the navigation ECU 3 detects various kinds of traveling conditions such as approach to the destination, deviation from the established route, and approach to the traffic congestion, and, based on such traveling conditions, large scale, detailed map data is acquired. Therefore, the detailed map data useful at a given time is automatically acquired at an appropriate timing, and appropriate route guidance is performed using such large scale map data. The detailed map data is not unnecessarily acquired, and detailed map data which will not be used for some time is not prematurely acquired. As a result, the storage capacity of the RAM 7 at the vehicle can be efficiently utilized, so the RAM 7 can be used to store other information or can be reduced in size.

While in the embodiment described above map data for display and for calculation is acquired through communication, it may be preferable to store another type of map data used for map matching process correcting the current position detected by the GPS device 11, in the database 5 in the form of conventional data.

In addition, while in the above embodiment the detailed map data is automatically acquired from an external source by the navigation ECU 3, the device can also be configured such that a user can request acquisition of a desired detailed map with use of the input device 13. In this case, the navigation ECU 3 acquires the instructed detailed map data from the information center 20 in accordance with user commands. The detailed map thus acquired is written in the RAM 7 and presented at the display 15. This function can be utilized when the user intentionally leaves the established route for a side trip and when the user wishes to know more about the geography of a particular area.

Also, while in the above embodiment a small scale map is written in a CD-ROM or the like and constantly held in the small scale map database 5, the small scale map can also be externally acquired through communication at the beginning of route guidance or the like. For example, at the entry of the destination, a small scale map covering the destination and the current position is acquired from the information center, and the acquired map is written in the RAM. In accordance with the traveling conditions, the necessary large scale map is acquired from the information center, and the small scale map data stored in the RAM is replaced by the detailed map data. When the small scale data is again needed, it is freshly acquired from the information center and written in the RAM. This contributes to reductions in cost and in memory capacity.

What is claimed is:

1. A map data distribution system including a base station and a transportable device linked with each other through communication means, wherein map data distributed from said base station is acquired from said transportable device, said transportable device comprising:

traveling condition detection means for detecting a traveling condition of said transportable device; and request means for sending a request to said base station for detailed map data of an area surrounding or neighboring said transportable device when a detailed map of the area is determined to be required based on the detected traveling condition; wherein said base station responds to the request from said transportable device by supplying the detailed map data of the area indicated in the request.

2. A map data acquisition device mounted to a transportable device for acquiring map data distributed from a base station via communication means, comprising:

traveling condition detection means for detecting a traveling condition of said transportable device;

request means for sending a request to said base station for detailed map data of an area surrounding or neighboring said transportable device when the detailed map of the area is determined to be required based on the traveling condition; wherein said detailed map data distributed from said base station in response to the request is acquired.

3. The map data acquisition device according to claim 2, wherein said traveling condition detection means includes positional relation detection means for detecting the positional relation between a current position of said transportable device and a destination, and said request means requests the detailed map data around the destination when it is detected that said transportable device is nearing the destination.

4. The map data acquisition device according to claim 2, further comprising:

route establishing means for establishing an appropriate route to a destination, wherein said traveling condition detection means includes deviation detection means for detecting whether or not said transportable device has deviated from the established route, and said request means requests detailed map data around the deviation point when it is detected that said transportable device has deviated from the established route.

5. The map data acquisition device according to claim 2, further comprising:

route establishing means for establishing an appropriate route to a destination, wherein said traveling condition detection means includes means for detecting the positional relation between a current position of said transportable device and a site on the established route for which a change in the established route is required when heavy traffic exists on said established route, and said request means requests the detailed map data around said site when said transportable device has approached to said site requiring a change in the established route.

6. The map data acquisition device according to claim 2, wherein said map data acquisition device is integrally mounted to a navigation device.

7. The navigation device including the map data acquisition device according to claim 6, wherein said navigation device includes a map database in which a small scale map data more general than the detailed map data is stored, and performs route guidance using the small scale map and the detailed map acquired in accordance with the detected traveling condition.

8. The map data acquisition device according to claim 6, wherein said base station distributing the map data to said map data acquisition device is included in an information center providing various types of information for vehicles to said navigation device.

* * * * *

UNITED STATES PATENT AND TRADEMARK OFFICE
CERTIFICATE OF CORRECTION

PATENT NO.: 6,052,645

DATED: April 18, 2000

INVENTOR(S): Tomoyasu HARADA

It is certified that an error appears in the above-identified patent and that said Letters Patent is hereby corrected as shown below:

Claim 1, col. 9, line 49, "abase" should read -- a base --.

Signed and Sealed this

Twentieth Day of February, 2001

Attest:

NICHOLAS P. GODICI

Attesting Officer

Acting Director of the United States Patent and Trademark Office